United States Patent [19]

Ikawa et al.

[11] Patent Number: 5,442,273
[45] Date of Patent: Aug. 15, 1995

[54] DRIVE CONTROL APPARATUS

[75] Inventors: Yasushi Ikawa; Seisuke Tsutsumi, both of Aichi, Japan

[73] Assignee: Mitsubishi Denki Kabushiki Kaisha, Tokyo, Japan

[21] Appl. No.: 215,716

[22] Filed: Mar. 22, 1994

[30] Foreign Application Priority Data

Mar. 23, 1993 [JP] Japan .................. 5-64050

[51] Int. Cl.⁶ .................. G05B 19/29; H02D 5/40
[52] U.S. Cl. .................. 318/799; 318/810; 318/608; 318/259
[58] Field of Search .................. 318/7, 560, 603, 626, 318/594, 254, 138, 600, 601, 602, 608, 565, 563, 798, 799–803, 806–810; 364/474.28, 474.35, 474.2, 474.16, 559, 167, 182; 360/73, 74.4, 72.2; 388/805, 813

[56] References Cited

U.S. PATENT DOCUMENTS

| | | | |
|---|---|---|---|
| 4,578,748 | 3/1986 | Abe et al. | 318/626 |
| 4,621,224 | 11/1986 | Watabe et al. | 318/594 |
| 4,628,314 | 12/1986 | Morinaga et al. | 318/594 |
| 4,639,884 | 1/1987 | Sagues | 318/603 |
| 4,731,657 | 3/1988 | Miyagi | 318/560 |
| 4,731,679 | 3/1988 | O'Gwynn et al. | 318/7 |
| 4,748,387 | 5/1988 | Tanuma et al. | 318/254 |
| 5,283,751 | 2/1994 | Simonin | 364/474.28 |

Primary Examiner—William M. Shoop, Jr.
Assistant Examiner—John W. Cabeca
Attorney, Agent, or Firm—Sughrue, Mion, Zinn, Macpeak & Seas

[57] ABSTRACT

An apparatus and method for controlling driving of a apparatus such as a motor. A signal representing the position and/or velocity of the motor is received by a drive control unit. A microprocessor in the drive control unit provides a division ratio signal and a rotation judging signal to a clock pulse divider and two-phase pulse generator, respectively, and also calculates the velocity of the apparatus in accordance with the condition data. The clock pulse divider divides a clock pulse signal in accordance with the division ratio signal and outputs a divided clock pulse signal. The two-phase pulse generator generates two-phase pulses having a 90-degree phase shift of a given polarity with respect to one another in accordance with the divided pulse signal, and reverses the polarity of the phase shift in accordance with the rotation judging signal. The microprocessor further outputs a control signal to control driving of the apparatus in accordance with the calculated velocity and the two-phase pulses.

18 Claims, 9 Drawing Sheets

PRIOR ART

FIG. 7

PRIOR ART

FIG. 8

PRIOR ART

DRIVE CONTROL APPARATUS

BACKGROUND OF THE INVENTION

1. Field of the Invention

The present invention relates to a drive control apparatus for controlling the position and/or velocity of an apparatus being driven, such as a motor, in accordance with a feedback signal provided by position detecting means attached to the driven apparatus.

2. Description of the Related Art

Figure 6:
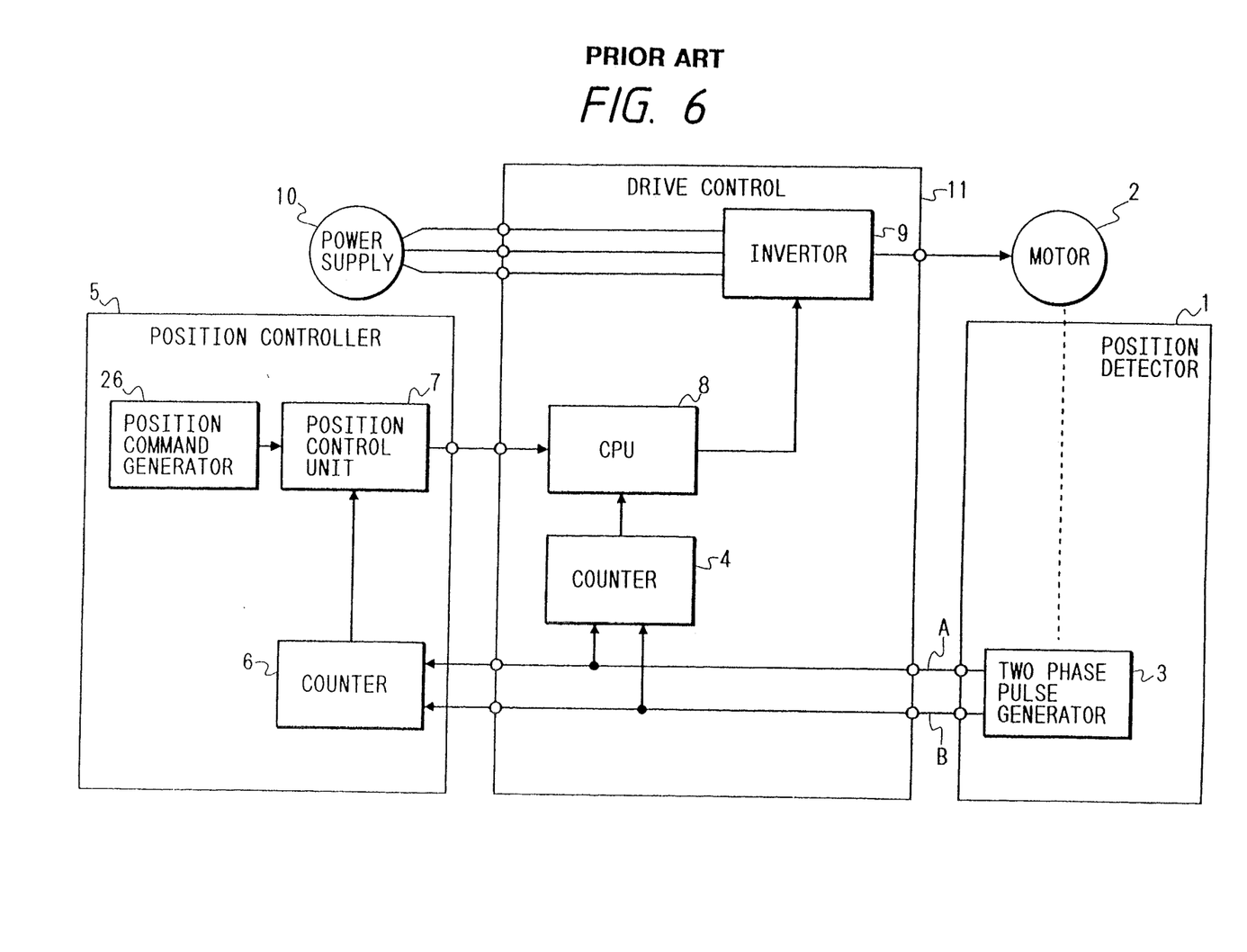
FIG. 6 is a block diagram of a conventional drive control apparatus using a position detector which outputs two-phase pulses.

FIG. 6 is a block diagram of a conventional drive control apparatus 11. In this arrangement, position detector 1 detects the position or velocity of a motor 2. A two-phase pulse generator 3 in the position detector 1 generates two-phase pulses according to the angular value of the motor 2. Counters 4 and 5, disposed in drive control apparatus 11 and position controller 5, count the number of pulses output by the two-phase pulse generator 3.

Position controller 5 further comprises a position command generator 26 which provides a position command signal to position control unit 7. Position control unit 7 outputs a velocity command signal to drive control apparatus 11 in accordance with the position command signal, provided by the position command generator 26, and the output signal provided by counter 6, which represents the number of pulses provided by the two-phase pulse generator 3 indicating the current position of the motor 2. Arithmetic unit 8 (CPU 8) then provides a control signal to inverter 9 in accordance with a signal provided by counter 4, representing the number of pulses provided by the two-phase pulse generator 3, and the velocity command signal provided by the position control unit 7.

Figure 7:
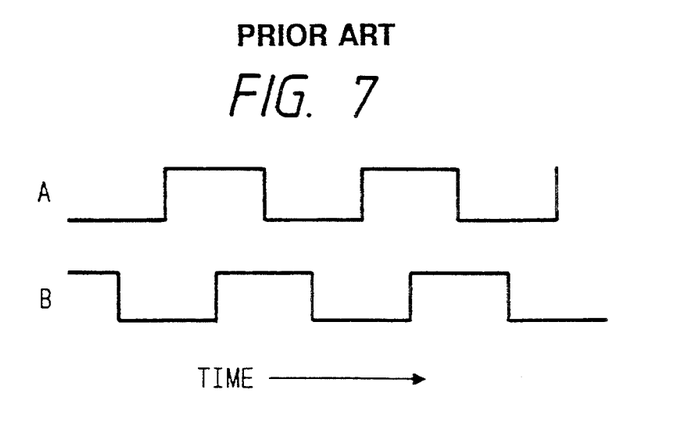
FIG. 7 is a graphical representation of an example of two-phase pulses output by the conventional position detector during the forward rotation of a motor.
Figure 8:
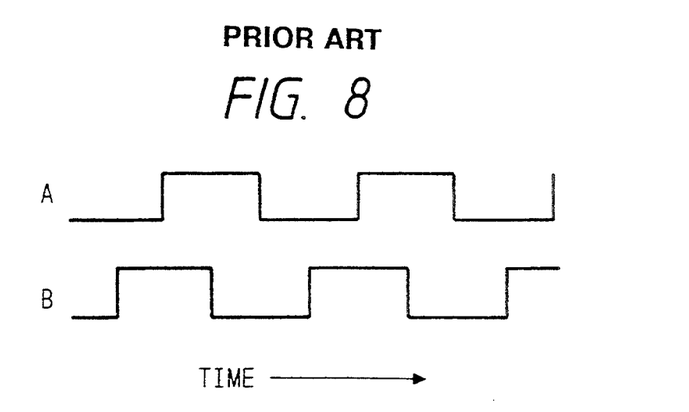
FIG. 8 is a graphical representation of an example of two-phase pulses output by the conventional position detector during reverse rotation of a motor.

The operation of the conventional apparatus will now be described in accordance with FIGS. 6 through 8. FIGS. 7 and 8 illustrate the output signals of the two-phase pulse generator 3, designated "A" and "B" in FIG. 6, during forward and backward rotation, respectively. As shown in FIG. 7, the pulses of signal A lead those of signal B by a phase angle of 90 degrees, and the number of pulses output is proportional to the angular position of the motor 2. Conversely, in FIG. 8, the pulses of signal A lag signal B by a phase angle of 90 degrees. Accordingly, the polarity of the phase shift between signal A and signal B represents the rotational direction of the motor 2, while the number of pulses of signals A and B represent the rotational position of the motor 2. Further, the frequency of the pulses represents the speed of the motor 2.

As shown in FIG. 6, signals A and B are input into the counter 4 in drive control apparatus 11, and further into the counter 6 in position controller 5. Counter 6 counts the number of pulses in signals A and B, and the position control unit 7 interprets these values as the angular position of the motor 2. The position control unit 7 provides the velocity command signal to the drive control apparatus 11 according to the position command generated by the position command generator 26 and the current position of the motor 2 as indicated by the signal provided by counter 6. Also, counter 4 in the drive control apparatus 11 counts the number of pulses in signals A and B in a manner similar to counter 6 in the position controller 5. The CPU 8 then reads the value of the counter 4 at a predetermined time "t". When the "n"th value is read, and represented as P(n), the CPU 8 calculates the current velocity V(n) of the motor 2 in accordance with the following formula:

$$V(n) = (P(n) - P(n-1))/t$$

CPU 8 then outputs a control signal, which controls the drive voltage of the motor 2, to the inverter 9 in accordance with the velocity command signal from the position controller 5 and the current velocity V(n) of the motor 2 as calculated from the signals provided by counter 4. The inverter 9 pulse width modulates (PWM) power provided by a three-phase alternating-current power supply 10 in accordance with the control signal and thereby controls the drive voltage provided to the motor 2.

A second conventional apparatus using a current position display device will now be described in accordance with FIG. 9. The apparatus shown in FIG. 9 comprises a velocity setting device 30, a current position display device 36, a decoder 28 which converts the data of the counter 6 into display data, and a display 29. The other components identical to those described in the first conventional apparatus are identified by the same reference numeral and will not be described.

As in the first conventional apparatus described with reference to FIG. 6, the two-phase pulse signals A and B generated by the two-phase pulse generator 3 in position detector 1 are input into counter 4 in the drive control apparatus 11 and the counter 6 in the current position display device 36. The counter 4 counts the number of pulses in the two-phase pulse signals A and B, and the CPU 8 outputs the control signal to control the drive voltage being provided to the inverter 9 in accordance with the velocity command from the speed setting device 30 and the velocity of the motor 2 as indicated by the signal provided by counter 4. Also, counter 6 counts the number of pulses present in two-phase pulse signals A and B in a manner similar to counter 4 and output a signal representing this count value to the decoder 28. The decoder 28 converts this signal into the display data indicating the position of the motor, and the display device 29 displays this data.

A third conventional apparatus comprising a position detector which outputs position data of an apparatus such as a motor in the form of serial data instead of pulse trains will now be described in accordance with FIG. 10.

Figure 9:
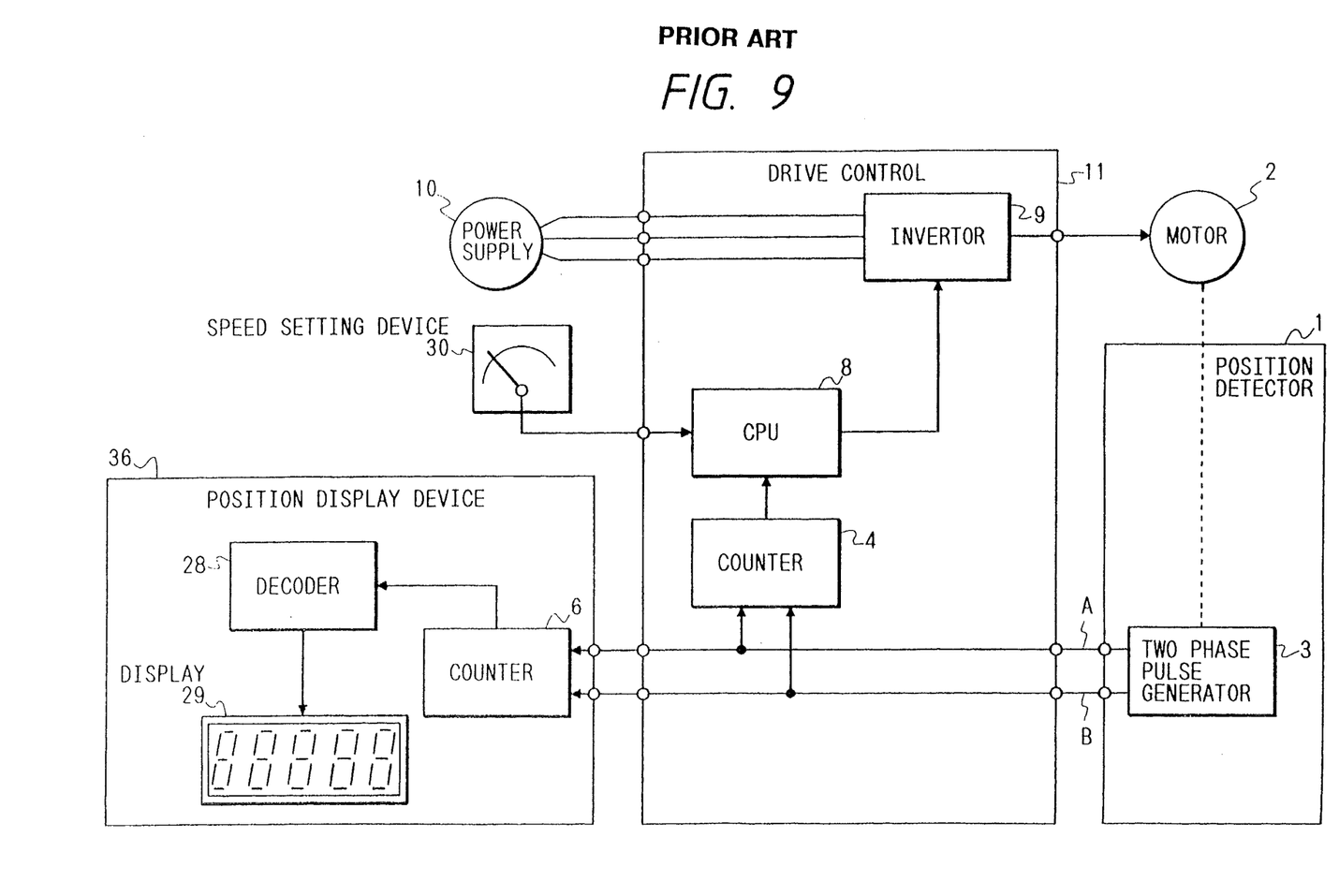
FIG. 9 is a block diagram of a conventional drive control apparatus having a conventional position display device is connected.
Figure 10:
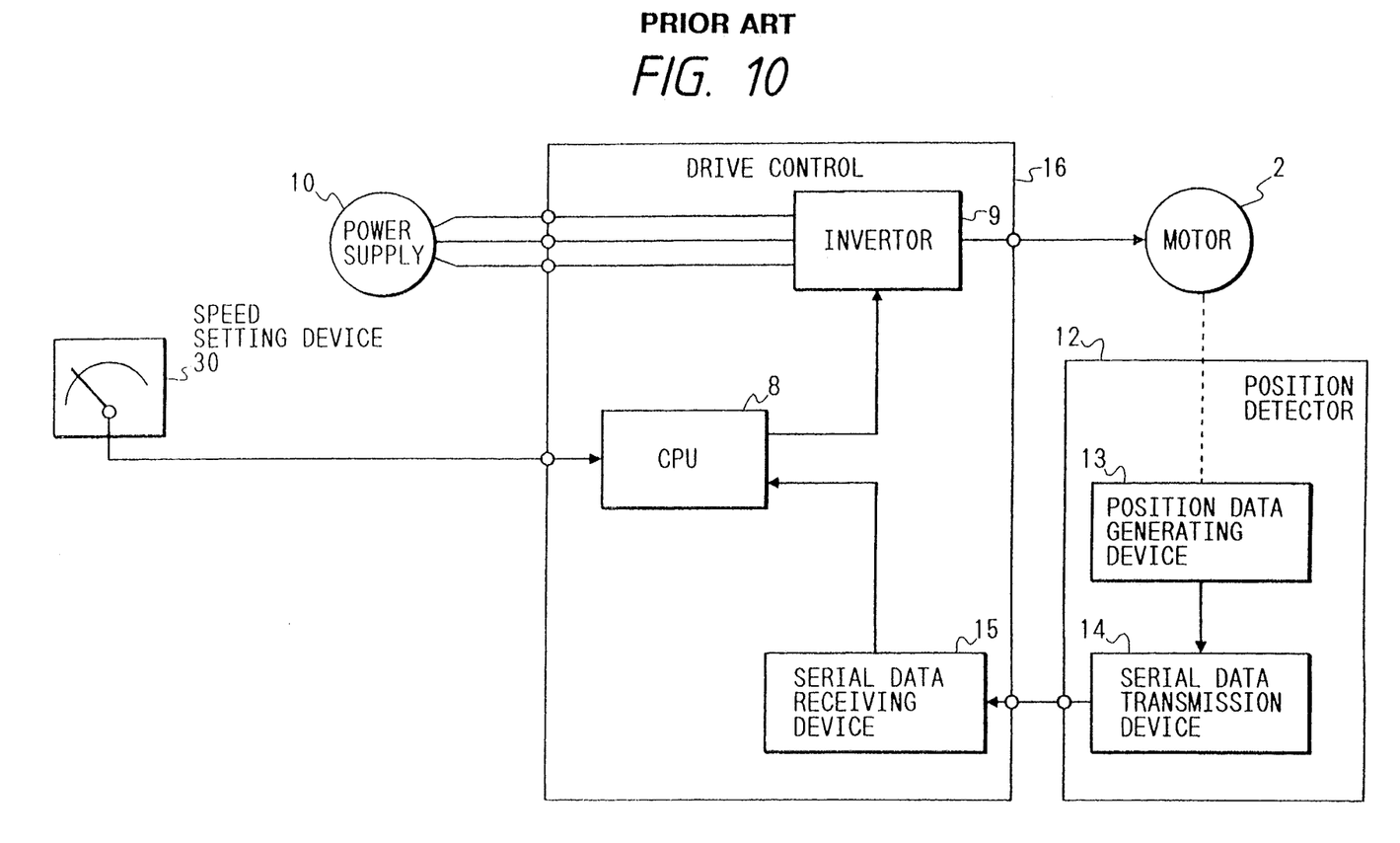
FIG. 10 is a block diagram of a conventional drive control apparatus using a conventional position detector outputting serial data.

The apparatus shown in FIG. 10 comprises a position detector 12 having a position data generating device 13 and a serial data transmission device 14. The apparatus further comprises a drive control apparatus 16 having a serial data receiving device 15, CPU 8 and inverter 9. Other components identical to those described in FIG. 9 are not described with reference to FIG. 10.

As shown in FIG. 10, the position data generating section 13 always generates numerical data representing the position of the motor 2. The serial transmission device 14 converts this data into serial data and transmits this serial data to the serial data receiving device 15. As is well known in the art, in serial transmission, binary data is transmitted in series one bit at a time using a single signal line. The serial data receiving device 15 converts the received serial data into position data that is compatible with the CPU 8. The CPU 8 reads this position data at a predetermined time "t" and calculates the velocity v(n) of the motor according to the following equation:

$$V(n) = (PF(n) - PF(n-1))/t$$

where PF(n) and PF(n−1) represent the position data being read at time t and a predetermined time interval prior to time t, respectively.

CPU 8 then outputs the control signal, for controlling the drive voltage, to the inverter 9 in accordance with the velocity V(n) of the motor 2, and the velocity command signal provided by the speed setting device 30. The inverter 9 pulse width modulates (PWM) power provided by the three-phase alternating-current power supply 10 in accordance with the control signal to thereby provide the motor 2 with the drive voltage.

As compared to the first or second conventional apparatus as shown in FIG. 6 or FIG. 9, the third conventional apparatus of FIG. 10 has less data transmission lines connected between the position detector 12 and the drive control apparatus 16. Thus, cost can be reduced and a wiring space can be saved.

However, the conventional drive control apparatus of FIG. 10 using serial data is incompatible with the position controller apparatus of FIGS. 6 and 9 which are designed to receive two-phase pulses. Also, in all of the above conventional apparatuses, it is impossible to check or adjust the operation of the drive control apparatus and the position controller if the apparatus being driven (e.g., the motor) and the position detector are not connected to the drive control apparatus.

SUMMARY OF THE INVENTION

According to one object of the present invention, a drive control apparatus designed to receive either two-phase pulse data or serial data representing the position and/or velocity of the apparatus being driven, while being compatible with a position controller capable of receiving only two-phase pulses is provided. Another object of the invention is to provide a drive control apparatus which enables the operation of a position controller and drive control apparatus to be monitored or adjusted independently of the position detecting device and the apparatus being driven.

To achieve these objects, the present invention provides an apparatus and method for controlling driving of the apparatus such as a motor, or the like. A signal representing the position and/or velocity of the motor is received by a drive control unit. This signal can be a two-phase pulse signal or a serial data signal.

If the signal is a two-phase pulse signal, a counter counts the two-phase pulse signal and provides condition data representing the position of the apparatus being driven to a microprocessor in the drive control unit. Otherwise, if the signal is a serial data signal, a serial data receiving device converts this serial data signal into data which is compatible with the microprocessor and provides that converted condition data representing the position of the apparatus being driven to the microprocessor.

A microprocessor in the drive control unit provides a division ratio signal and a rotation judging signal to a clock pulse divider and two-phase pulse generator, respectively, and also calculates the velocity of the apparatus in accordance with the condition data provided from the counter or the serial data receiving device.

The clock pulse divider divides a clock pulse signal, provided by an oscillator circuit, in accordance with the division ratio signal and outputs a divided clock pulse signal. The two-phase pulse generator generates two-phase pulses having a 90-degree phase shift of a given polarity with respect to one another in accordance with the divided pulse signal, and reverses the polarity of the phase shift in accordance with the rotation judging signal.

A counter counts the number of two-phase pulses and provides a signal representing this number to the microprocessor, which then adjusts the division ratio signal in accordance with this signal. Furthermore, these two-phase pulses are provided to a position controller apparatus.

The position controller apparatus comprises a counter which counts the number of two-phase pulses and provides a count signal indicative thereof. Also, a position command generator in the position controller generates a position command signal. A position control unit in the position controller apparatus generates a velocity control signal in accordance with the count signal and the position command signal and outputs this velocity control signal to the drive control apparatus. The microprocessor of the drive control apparatus receives this velocity control signal and then outputs a control signal to control driving of the apparatus in accordance with this velocity control signal and the calculated velocity.

The drive control apparatus further comprises an apparatus simulator for providing data which simulates driving of the apparatus. A switching device provides either this simulated data or, the condition data to the microprocessor. That is, if a simulated control condition is desired, the switch can be adjusted to provide the simulated data to the microprocessor, and the microprocessor provides a simulated control signal in the same manner that it provides the control signal as described above. However, if the control condition is desired, the switch can be adjusted to provide the condition data to the microprocessor, which then uses this condition data to generate the control signal as described above.

Hence, the drive control apparatus of the present invention can be designed to receive serial data or two-phase pulse data from the detector and be compatible with the two-phase pulse type position controller. Furthermore, the simulator enables the drive control apparatus to generate a simulated control signal when there is no apparatus being driven. Hence, operation of the drive control apparatus can be adjusted and monitored based on this simulated control signal independent of the detector and apparatus being driven.

BRIEF DESCRIPTION OF THE DRAWINGS

These and other objects and advantages of the invention will become more apparent and more readily appreciated from the following detailed description of the preferred exemplary embodiments of the invention taken in conjunction with the accompanying drawings, of which.

DETAILED DESCRIPTION OF THE PREFERRED EMBODIMENTS

Figure 1:
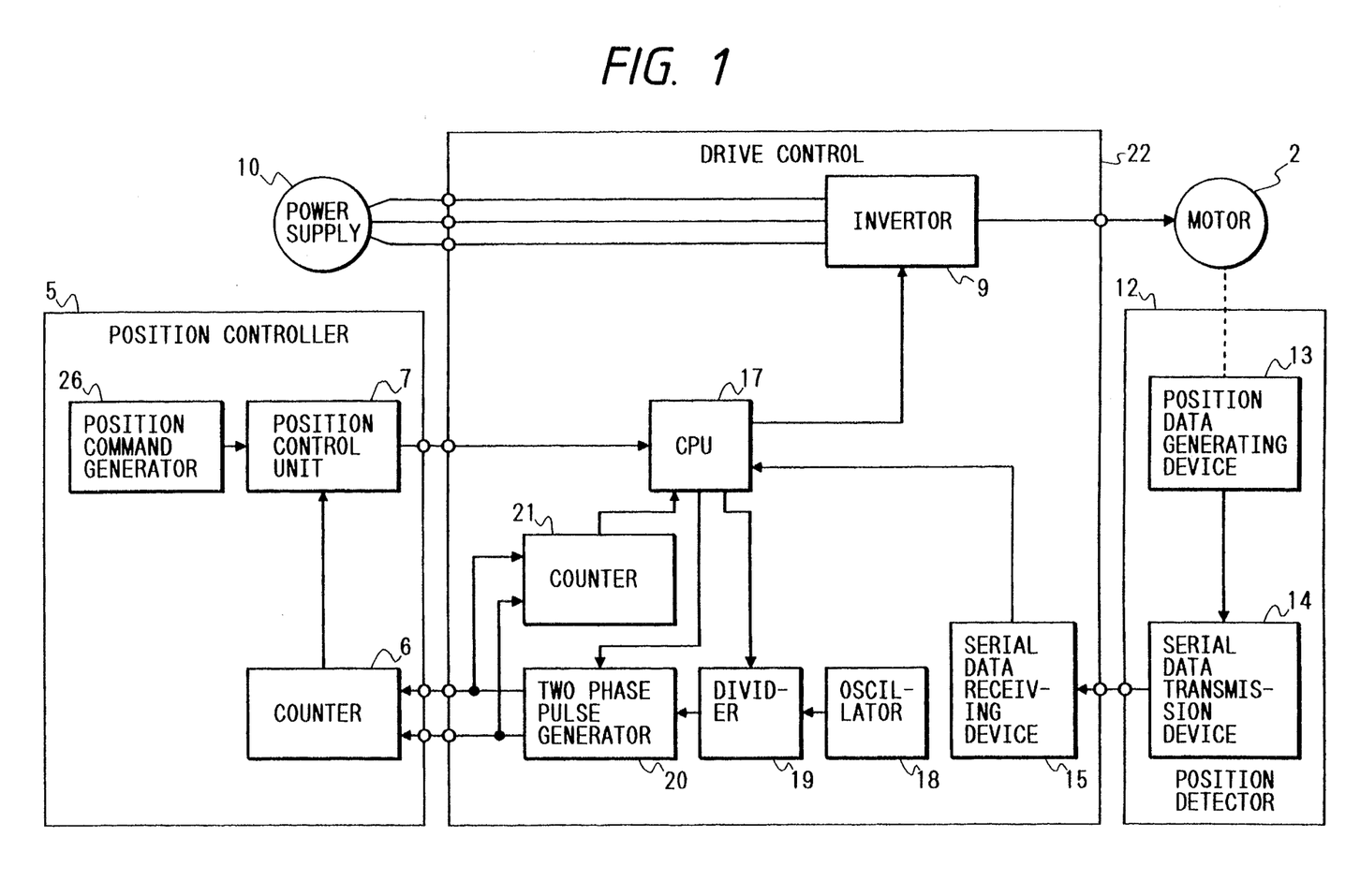
FIG. 1 is a block diagram of a drive control apparatus according to a first embodiment of the present invention.
Figure 2:
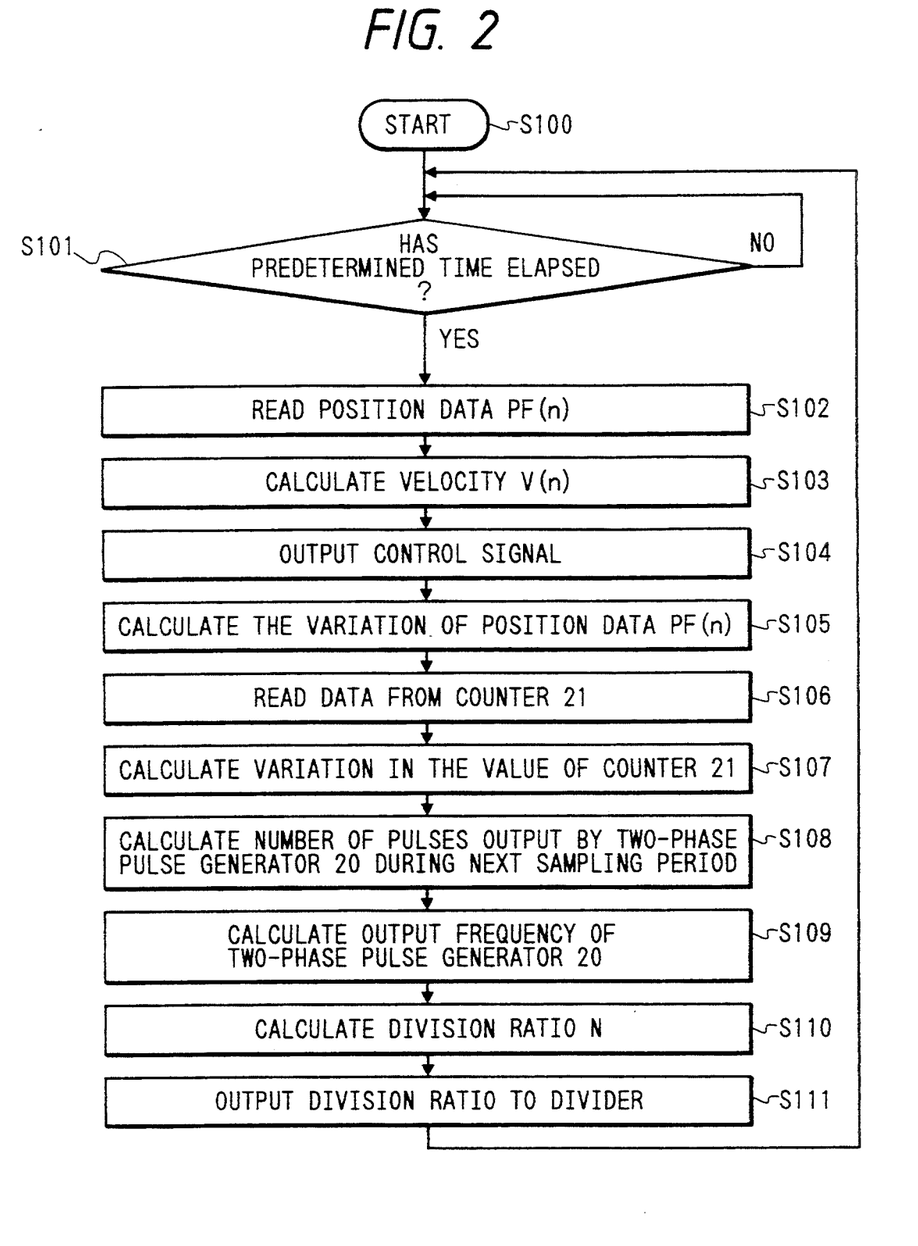
FIG. 2 is a flowchart illustrating the operation of the first embodiment shown in FIG. 1.

FIG. 1 is a block diagram showing an embodiment of the drive control apparatus of the present invention, and FIG. 2 illustrates a flowchart representing the operation of the apparatus of FIG. 1.

Drive control apparatus 22 comprises CPU 17 which provides a control signal to inverter 9 to control the apparatus being driven such as a motor or the like. CPU 17 further provides a signal to set a division ratio of the divider 19, and further provides a signal to set the polarity of a phase lag of a two-phase pulse generator 20. The divider 19 divides a system clock pulse generated by an oscillator 18 in accordance with the division ratio set by the CPU 17. A counter 21 counts the number of two-phase pulses output by the two-phase pulse generator 20. The other parts are the same as those in the conventional apparatus and will not be described here.

As shown in FIG. 1, the position data generating section 13 detects the angular position of the motor 2 and outputs signals representing this angular position. The serial data transmission device 14 converts this position data into serial position data and transmits the serial position data to the drive control apparatus 22. The serial data receiving device 15 in the drive control apparatus 22 converts the serial data into data which is compatible with the CPU 17.

As indicated in step S101 in FIG. 2, the CPU 17 waits until a predetermined length of time elapses. Subsequently, in step S102, the CPU 17 reads the position data PF(n) provided by the serial data receiving device 15 and in step S103, calculates the velocity V(n) of the motor 2 in accordance with the following equation:

$$V(n) = (PF(n) - PF(n-1))/t$$

where PF(n) and PF(n−1) represent the position data being read at time t and a predetermined time interval prior to time t, respectively.

In step S104, the CPU 17 then outputs the control signal, for controlling the drive voltage, to the inverter 9 in accordance with the velocity command signal provided by the position controller 5, as in the known apparatuses, and the calculated velocity V(n).

Next, in step S105, the CPU 17 calculates the variation ΔPF(n) of the position data PF(n) from the values of the position data read at two of the most previous times according to the following equation:

$$\Delta PF(n) = PF(n-1) - PF(n-2)$$

Then, in step S106, the CPU 17 reads the value PO(n) provided by counter 21 which counts the number of pulses output by the two-phase pulse generator 20. In step S107, the CPU 17 calculates the variation ΔPO(n) of the value of PO(n) of the counter 21 from PO(n−1) read at a previous time according to the following equation:

$$\Delta PO(n) = PO(n) - PO(n-1)$$

In step S108, the CPU 17 calculates the number of pulses ΔPd(n) output by the two-phase pulse generator 20 during the next sampling period according to the following equation:

$$\Delta Pd(n) = PF(n) + ((\Delta PF(n-1) - \Delta PO(n)))$$

In step S109, the CPU 17 calculates output frequency f0(n) of the two-phase pulse generator according to the following equation:

$$f0(n) = \Delta Pd(n)/Ts$$

where Ts equals a sampling period. Then, in step S110, the CPU 17 calculates the division ratio N according to the following equation:

$$N = fCLK/f0(n)$$

where fCLK = oscillation frequency of the oscillator 18. In step S111, the CPU 17 outputs the division ratio N to the divider 19. When the division ratio N is provided to the divider 19, the divider 19 divides the output pulse of the oscillator 18.

The two-phase pulse generator 20 then generates two-phase pulse trains, having a 90-degree phase difference with the polarity of the phase difference reversed, in accordance with a rotation direction judging signal provided by the CPU 17 and the divided pulse signal provided by divider 19, and outputs these two-phase pulse trains to the position controller 5. The counter 6 in the position controller 5 counts the two-phase pulse trains and provides a signal representing the number of pulses in the pulse trains to the position control section 7. As in the prior art, the number of pulses corresponds to the position of the motor 2.

The position control unit 7 then outputs the velocity command signal to the drive control apparatus 22 in accordance with the position command signal generated by the position command generating device 26 and the signal provided by the counter 6 representing the position of the motor 2. The CPU 17 generates a control signal in accordance with the velocity command signal and provides this control signal to the inverter 9. The inverter 9 pulse width modulates the power provided by the three-phase alternating-current power supply 10 in accordance with the control signal provided by the CPU 17, and, thus, controls the drive voltage being provided to the motor 2 by the power supply 10.

Accordingly, the above drive control apparatus 22 is compatible with a serial data type position detector 12 and a position controller 5 which is designed to receive two-phase pulses. Also, a position display device such as that shown in the second conventional apparatus of FIG. 9 can be connected to the drive control apparatus 22 according to the above embodiment to display the position of the motor.

Figure 3:
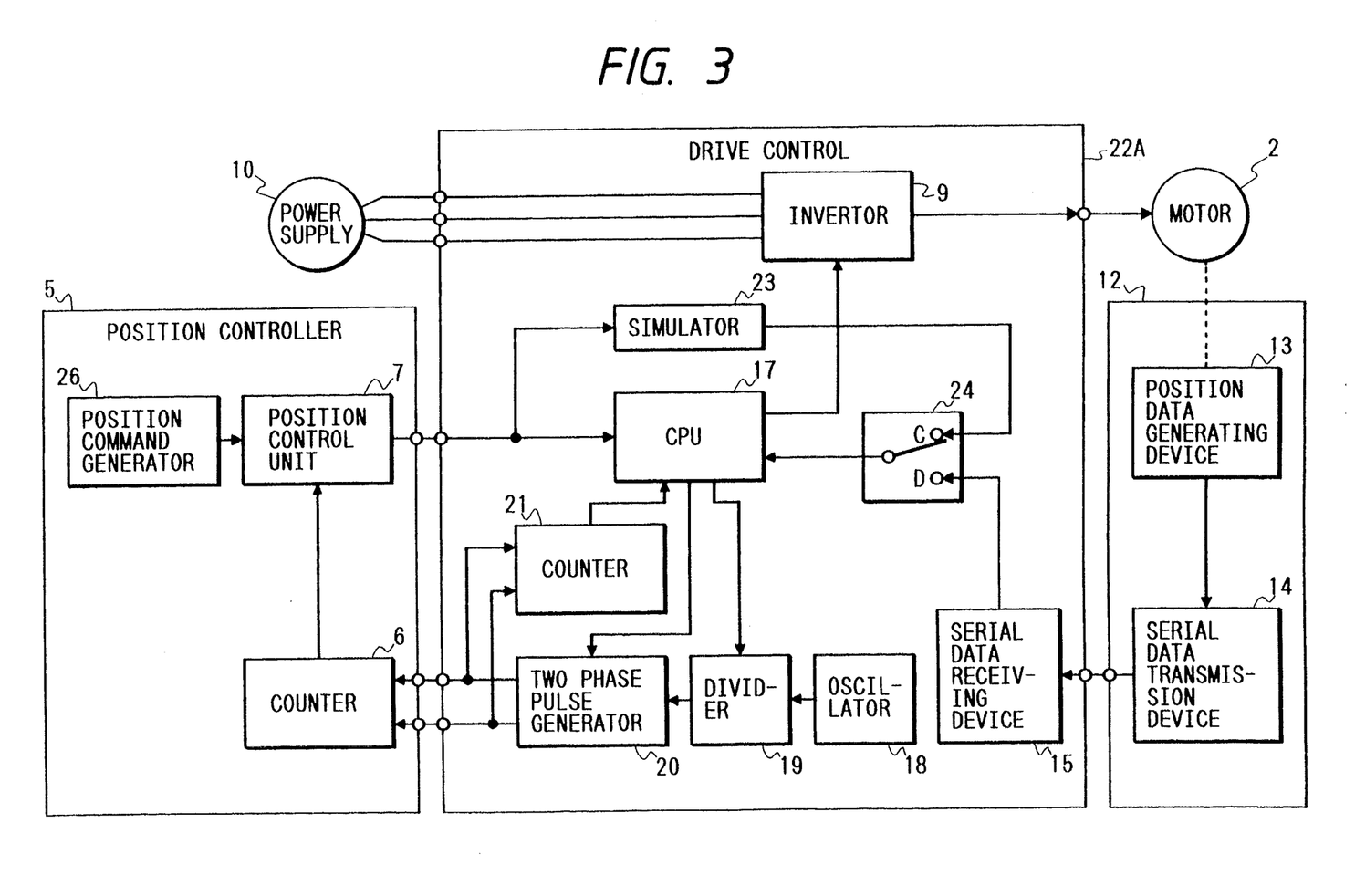
FIG. 3 is a block diagram of a drive control apparatus according to a second embodiment of the present invention.

A second embodiment of the present invention will now be described in accordance with the block diagrams shown in FIGS. 3 and 4. A simulator 23, shown in FIGS. 3 and 4, simulates the operation of motor 2 as controlled by the control signal provided by the CPU 17, generated in accordance with the velocity command signal, and outputs signals representing the simulated position of the motor 2. A switch 24 switches between the output of the simulator 23 and the output of the serial data receiving device 15.

As in the first embodiment, a drive control apparatus 22A comprises an inverter 9, CPU 17, simulator 23, serial data receiving device 15, oscillator 18, divider 19, two-phase pulse generator 20 and counter 21. These components are identical to those of the first embodiment and are not described in detail below.

Figure 4:
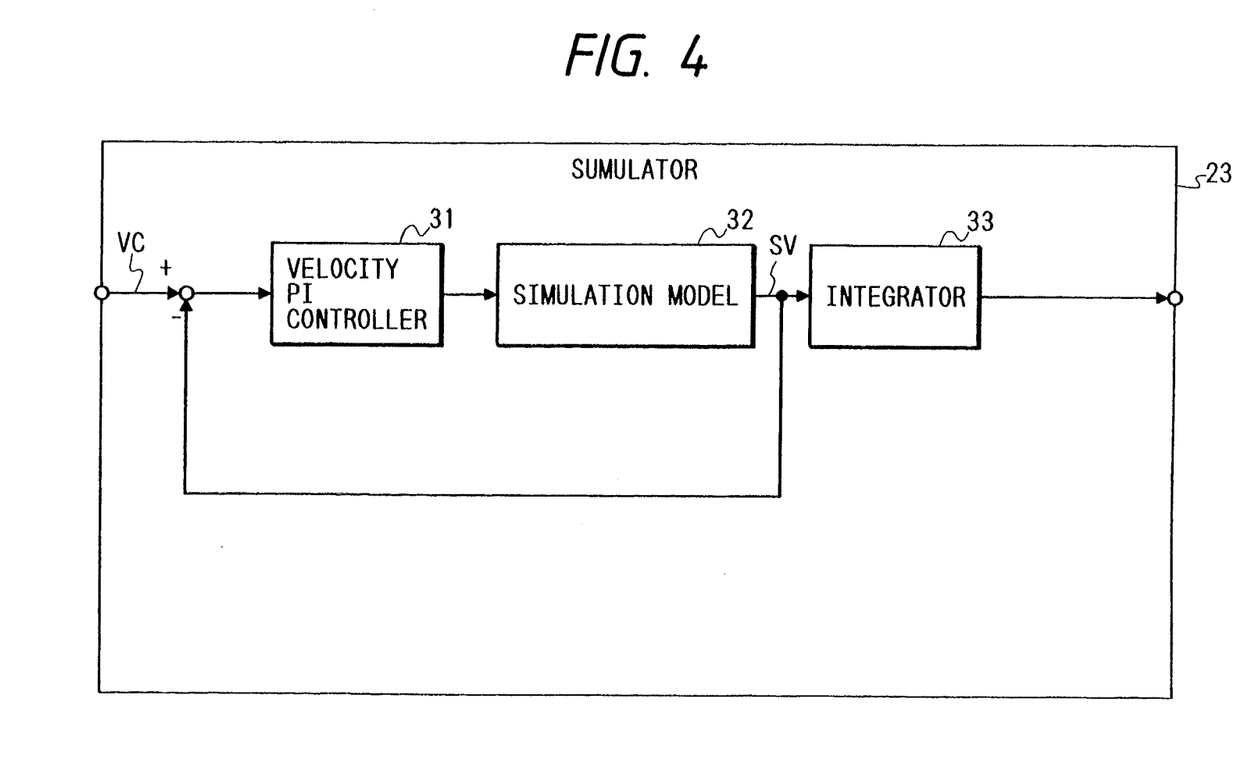
FIG. 4 illustrates a block diagram of an exemplary embodiment of the simulator in the second embodiment shown in FIG. 3.

FIG. 4 illustrates a detailed exemplary embodiment of the simulator 23, comprising a velocity PI controller 31, a simulation model 32 of the motor, and an integrator 33. Velocity command signal VC is input at input 35, and the simulated velocity signal SV is output from simulation model 32.

That is, when the switch 24 is switched to position C, the output signal of the simulator 23 is input to the CPU 17 and the CPU 17, oscillator 18, divider 19, two-phase pulse generator 20 and counter 21 operate in the same manner as those described in the first embodiment. The pulse signals provided by the two-phase pulse generator 20 are input into position controller 5 and counted by the counter 6. As in the first embodiment, the position control unit 7 outputs the velocity command to the drive control apparatus 22A in accordance with the counter value signal provided by counter 6 and the position command signal generated by the position command generator 26. Also, when the switch 24 is switched to position D, the output from the serial data receiving device 15 is input to the CPU 17, and the drive control apparatus 22A operates identically to the first embodiment.

The operation of the simulator 23 will now be described in accordance with FIG. 4. When the velocity command 35 is input to the simulator 23, the PI controller 31 performs a proportional control operation in accordance with the deviation of the velocity command signal VC 35 from the simulated velocity signal SV and provides a signal to the simulated motor model 32. The simulated motor model 32 outputs the simulated motor velocity 34 based on a selected inertia value J and torque constant Kt. The integrator 33 integrates the simulated motor velocity signal SV and outputs a signal representing a simulated position of the motor 2. Accordingly, the operation of the control apparatus 22A, designed to receive serial data, can be checked and adjusted without attaching an actual motor 2. Also, a position display device such as that shown for the conventional apparatus in FIG. 9, can be connected to display the position of the motor 2 or simulated position of the simulated motor.

Figure 5:
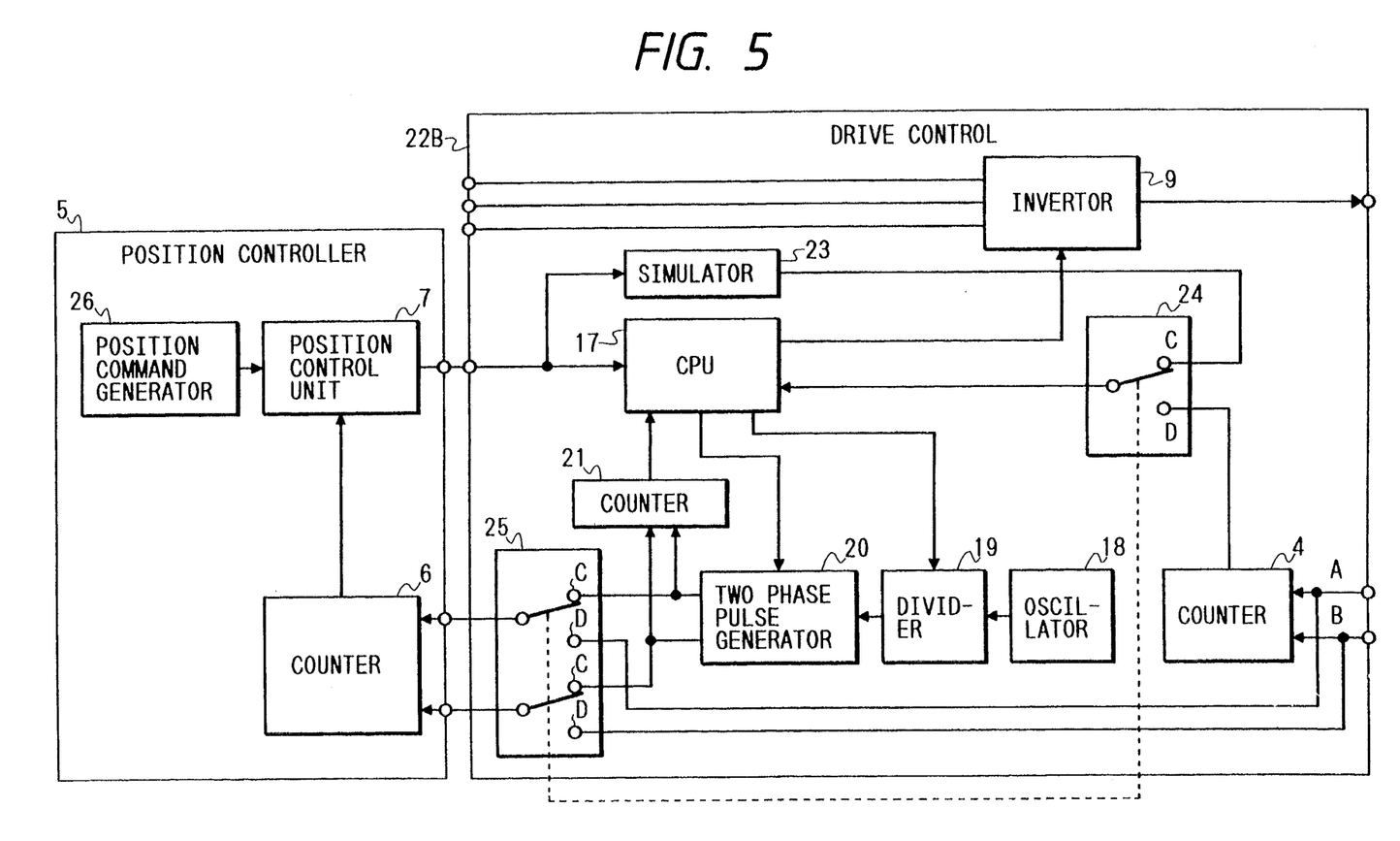
FIG. 5 is a block diagram of a drive control apparatus according to a third embodiment of the present invention.

FIG. 5 illustrates a block diagram showing a third embodiment of the present invention, similar to the second embodiment. In this embodiment, drive control apparatus 22B comprises a pulse selector switch 25 is switched simultaneously with the selector 24. As in the second embodiment, drive control apparatus 22B further comprises inverter 9, CPU 17, simulator 23, selector switch 24, counter 4, oscillator 18, divider 19, two-phase pulse generator 20, counter 21 and pulse selector 26, which are identical to those of the first and second embodiments as shown in FIGS. 1 and 3 and will not be described.

In the operation of the third embodiment, the selector switch 24 and the pulse selector 26 are set to position C. The signal representing the simulated position of the motor 2 is then output from the simulator 23 in accordance with the velocity command signal provided by position controller 5. This simulated signal is input to the CPU 17, and the CPU 17, oscillator 18, divider 19, two-phase pulse generator 20 and counter 21 operate in the same manner as in the first embodiment. Subsequently, the two-phase pulses having a 90 degree phase difference which are output by the two-phase pulse generator 20 are provided to the position controller 5 via the pulse selector switch 25. The position controller 5 then outputs the velocity command signal to the drive control apparatus 22B in a manner similar to the first and second embodiments.

Alternatively, the selector switch 24 and the pulse selector switch 25 are switched to position D to provide the output from counter 4 to the CPU and to input the two-phase pulses provided by the position detector 1 (see FIG. 1) to the position controller 5. Accordingly, the drive control apparatus of the third embodiment will then operate in the same manner as the conventional apparatus shown in FIG. 6.

Hence, the operation of the control apparatus 22B, designed to receive two-phase input pulses, can be checked and adjusted without attaching an actual motor 2. Also, a position display device such as that shown for the convention apparatus in FIG. 9, can be connected to display the position of the motor 2 or simulated position of the simulated motor.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A drive control apparatus, for use with a device for detecting at least one of the position and velocity of an apparatus being driven by a power supply and outputting condition data representative thereof, for controlling driving of the apparatus, comprising:
    means for dividing a clock pulse signal in accordance with a division ratio signal and outputting a divided clock pulse signal;
    means for generating two-phase pulses having a 90-degree phase shift of a given polarity with respect to one another in accordance with the divided pulse signal, and for reversing the polarity of the phase shift in accordance with a rotation judging signal; and
    processing means for providing the division ratio signal and the rotation judging signal, calculating the velocity of the apparatus in accordance with the condition data, and outputting a control signal to control driving of the apparatus in accordance with the calculated velocity and the two-phase pulses.

2. A drive control apparatus as claimed in claim 1, wherein the condition data is serial data, further comprising:

means for converting the serial data into converted condition data and providing the converted condition data to the processing means, the processing means calculating the velocity of the apparatus in accordance with the converted condition data.

3. A drive control apparatus as claimed in claim 1, further comprising:
means for generating a position command signal; and
means for generating a velocity command signal in accordance with the position command signal and the two-phase pulses and providing the velocity command signal to the processing means;
said processing means outputting the control signal to control driving of the apparatus in accordance with the calculated velocity and the velocity command signal.

4. A drive control apparatus as claimed in claim 1, further comprising means for counting the two-phase pulses and providing a counting signal to the processing means.

5. A drive control apparatus as claimed in claim 1, further comprising:
means for displaying data representing the position of the apparatus in accordance with the two-phase pulses.

6. An drive control apparatus as claimed in claim 1, wherein the apparatus is a motor.

7. A drive control apparatus, for use with a device for detecting at least one of the position and velocity of an apparatus being driven by a power supply and outputting condition data representative thereof, for controlling driving of the apparatus, comprising:
means for dividing a clock pulse signal in accordance with a division ratio signal and outputting a divided clock pulse signal;
means for generating two-phase pulses having a 90-degree phase shift of a given polarity with respect to one another in accordance with the divided pulse signal, and for reversing the polarity of the phase shift in accordance with a rotation judging signal;
means for simulating a driving condition of the apparatus and providing simulated condition signals representative thereof;
processing means for providing the division ratio signal and the rotation judging signal; and
switching means for providing one of the simulated condition signals and the condition signals to the processing means;
the processing means calculating one of the velocity of the apparatus and a simulated velocity of the apparatus in accordance with one of the condition data and simulated condition data, respectively, and outputting a control signal to control driving of the apparatus in accordance with the calculated velocity and the two-phase pulses.

8. A drive control as claimed in claim 7, wherein the condition data is serial data, further comprising:
means for converting the serial data into converted condition data and providing the converted condition data to the processing means, the processing means calculating the velocity of the apparatus in accordance with the converted condition data.

9. A drive control apparatus as claimed in claim 7, further comprising:
means for generating a position command signal; and
means for generating a velocity command signal in accordance with the position command signal and the two-phase pulses and providing the velocity command signal to the processing means;
said processing means outputting the control signal to control driving of the apparatus in accordance with the calculated velocity and the velocity command signal.

10. A drive control apparatus as claimed in claim 7, further comprising means for counting the two-phase pulses and providing a counting signal to the processing means.

11. A drive control apparatus as claimed in claim 7, further comprising:
means for displaying data representing the position of the apparatus in accordance with the two-phase pulses.

12. An drive control apparatus as claimed in claim 7, wherein the apparatus is a motor.

13. A method for controlling an apparatus being driven by a power supply, comprising the steps of:
dividing a clock pulse signal in accordance with a division ratio signal and outputting a divided clock pulse signal;
generating two-phase pulses having a 90-degree phase shift of a given polarity with respect to one another in accordance with the divided pulse signal, and reversing the polarity of the phase shift in accordance with a rotation judging signal;
calculating the velocity of the apparatus in accordance with condition data representing at least one of the velocity and position of the apparatus; and
outputting a control signal to control driving of the apparatus in accordance with the calculated velocity and the two-phase pulses.

14. An method as claimed in claim 13, wherein the condition data is serial data, and the calculating step further comprises the step of converting the serial data into converted condition data calculating the velocity of the apparatus in accordance with the converted condition data.

15. A method as claimed in claim 13, wherein the control signal outputting step comprises the steps of:
generating a position command signal;
generating a velocity command signal in accordance with the position command signal and the two-phase pulses; and
outputting the control signal in accordance with the calculated velocity and the velocity command signal.

16. A method as claimed in claim 13, further comprising the steps of:
counting the two-phase pulses; and
providing a counting signal to the microprocessor means representing the number of two-phase pulses.

17. A method as claimed in claim 13, further comprising the step of:
displaying data representing the position of the apparatus in accordance with the two-phase pulses.

18. A method as claimed in claim 13, wherein the apparatus is a motor.

* * * * *